(12) United States Patent
Kochar et al.

(10) Patent No.: US 8,601,250 B2
(45) Date of Patent: Dec. 3, 2013

(54) CONTROL OVER LOADING OF DEVICE DRIVERS FOR AN INDIVIDUAL INSTANCE OF A PCI DEVICE

(75) Inventors: Sumeet Kochar, Apex, NC (US); Adam L. Soderlund, Bahama, NC (US); Michael R. Turner, Carnation, WA (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 13/108,638

(22) Filed: May 16, 2011

(65) Prior Publication Data

US 2012/0297099 A1  Nov. 22, 2012

(51) Int. Cl.
G06F 9/00 (2006.01)
G06F 15/177 (2006.01)

(52) U.S. Cl.
USPC .................................................. 713/2; 713/1

(58) Field of Classification Search
USPC ......................................................... 713/1, 2
See application file for complete search history.

(56) References Cited

U.S. PATENT DOCUMENTS

| | | | | |
|---|---|---|---|---|
| 5,692,219 A * | 11/1997 | Chan et al. | ...................... | 710/49 |
| 6,513,114 B1 * | 1/2003 | Wu et al. | ........................... | 713/2 |
| 7,080,244 B2 * | 7/2006 | Natu et al. | ....................... | 713/1 |
| 7,257,704 B2 | 8/2007 | O'Neal | | |
| 2002/0143921 A1 * | 10/2002 | Stephan | ........................ | 709/223 |
| 2003/0005026 A1 | 1/2003 | Bower, III | | |
| 2003/0126302 A1 | 7/2003 | Bower, III | | |
| 2008/0072028 A1 * | 3/2008 | Allison et al. | ..................... | 713/1 |
| 2009/0119496 A1 * | 5/2009 | Chen et al. | ........................ | 713/1 |
| 2012/0278600 A1 * | 11/2012 | Mese et al. | ........................ | 713/2 |

* cited by examiner

*Primary Examiner* — Vincent Tran
(74) *Attorney, Agent, or Firm* — Thomas E. Tyson; Jeffrey L. Streets

(57) ABSTRACT

A method identifies a plurality of PCI devices in a computer system by an associated PCI device handle, wherein each of the PCI devices is also associated with a default EFI device driver. The method further identifies a target PCI device to be disabled from within the plurality of PCI devices, provides a dummy driver that enables fewer functions for the target PCI device than would the default EFI device driver, and binds the dummy driver to the target PCI device instead of binding the default EFI device driver associated with the target PCI device. The dummy driver may be used to effectively disable the target PCI device so that the POST does not hang up or completes faster without loading the default EFI device driver.

23 Claims, 4 Drawing Sheets

CONTROL OVER LOADING OF DEVICE DRIVERS FOR AN INDIVIDUAL INSTANCE OF A PCI DEVICE

BACKGROUND

1. Field of the Invention

The present invention relates to PCI device drivers, and methods of loading PCI device drivers.

2. Background of the Related Art

It is common for computer systems to include a Basic Input Output System (BIOS) that provides an interface to firmware and is responsible for various tasks, including the identification of system devices and booting the operating system. A BIOS user interface allows for various changes to the system operation. However, while BIOS is still prevalent, newer computer systems may now include an Extensible Firmware Interface (EFI), which includes the more recent Unified Extensible Firmware Interface (UEFI) specification. Like BIOS, the EFI provides a software interface between the operating system and platform hardware. However, EFI runs independent of the processor architecture, includes data tables containing platform information, and provides both boot services and runtime services that are available to the operating system (OS) loader and OS.

The expanded capabilities of the EFI firmware allow a system to boot from larger disks, boot-up in shorter amounts of time, and utilize CPU-independent drivers. Furthermore, EFI supports a shell environment whereby other EFI applications can gain access to the services in the kernel. EFI also allows for extensions to any nonvolatile storage device coupled to the system, such as an EFI partition of an attached hard disk drive.

A server or other computer may have one or more peripheral component interconnect (PCI) Root Bridge with one or more PCI Express (PCIe) devices behind each PCI Root Bridge. Examples of PCI Express (PCIe) devices include Ethernet adapters and Serial Attached SCSI (SAS) adapters. A PCI Root Bridge is represented in UEFI as a device handle that contains a Device Path Protocol instance and a PCI Root Bridge Protocol instance. PCI Bus Drivers manage PCI buses present in a system. A PCI Bus Driver creates child device handles that must contain a Device Path Protocol instance and a PCI I/O Protocol instance. The PCI I/O Protocol for a given PCI device handle is used by a PCI Device Driver to access memory and I/O on the PCI device.

According to the UEFI specification, each PCI device is identified by a device path protocol and a PCI I/O protocol, which collectively define a "device handle." For a PCI device, a device path protocol represents the location of the device in the system PCI tree starting at the PCI Root Bridge level, and a PCI I/O protocol provides a means for accessing the device. Each PCI adapter has it's own vendor-provided UEFI Driver that reviews all PCI device instances/handles discovered by the PCI bus driver and binds with a PCI device that it is written to support. The process of binding essentially means that an EFI driver is now managing a specific PCI device (referenced via it's handle) and will enable it's full functionality.

BRIEF SUMMARY

One embodiment of the present invention provides a method comprising identifying a plurality of PCI devices in a computer system by an associated PCI device handle, wherein each of the PCI devices is also associated with a default EFI device driver. The method further comprises identifying a target PCI device to be disabled from within the plurality of PCI devices, providing a dummy driver that enables fewer functions for the target PCI device than the default EFI device driver, and binding the dummy driver to the target PCI device instead of binding the default EFI device driver associated with the target PCI device.

Another embodiment of the invention provides a computer program product including computer usable program code embodied on a computer usable storage medium. The computer program product comprises computer usable program code for identifying a plurality of PCI devices in a computer system by an associated PCI device handle, wherein each of the PCI devices is also associated with a default EFI device driver; computer usable program code for identifying a target PCI device to be disabled from within the plurality of PCI devices; computer usable program code for providing a dummy driver that enables fewer functions for the target PCI device than the default EFI device driver; and computer usable program code for binding the dummy driver to the target PCI device instead of binding the default EFI device driver associated with the target PCI device.

DETAILED DESCRIPTION

Figure 1:
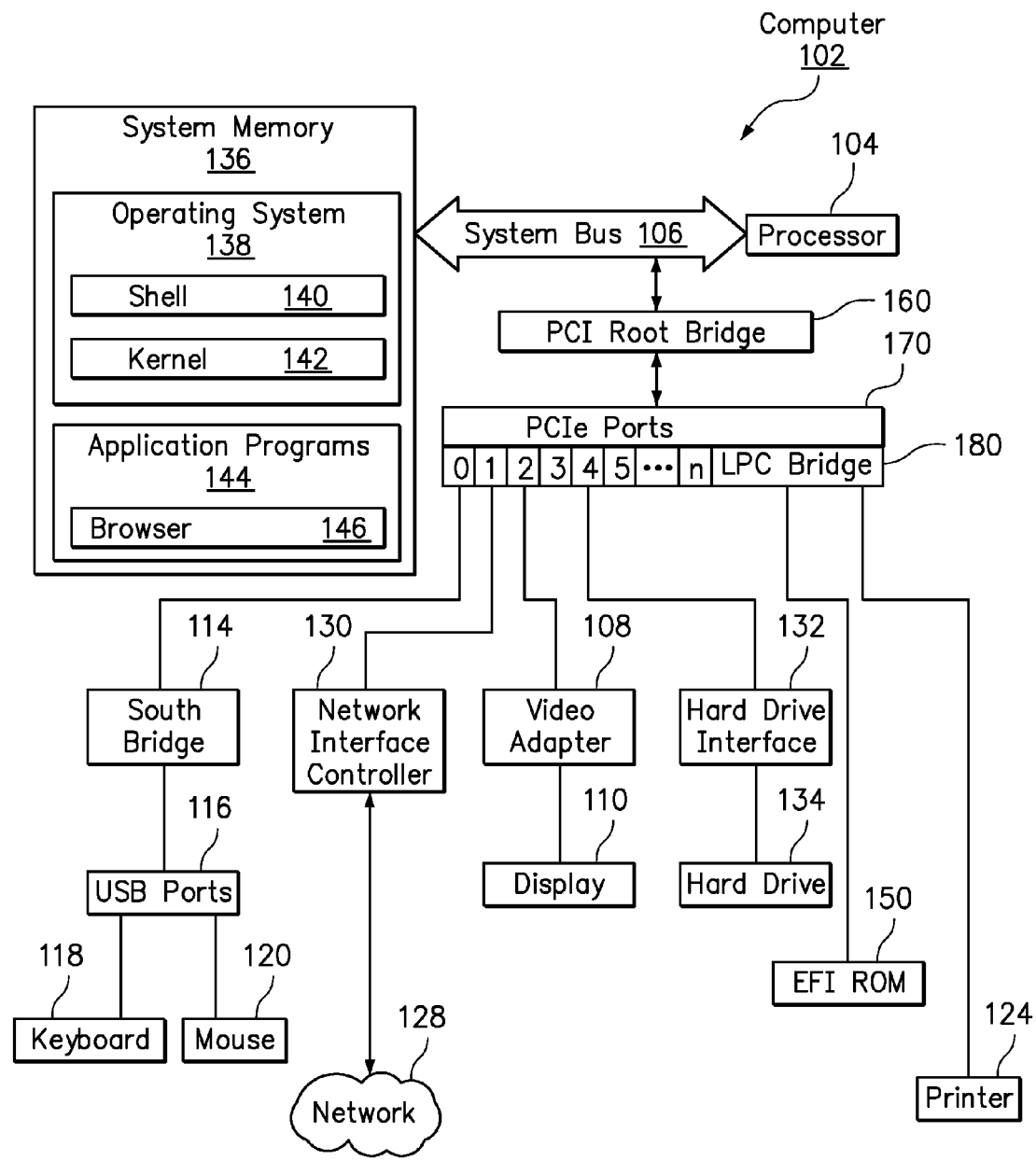
FIG. 1 is a schematic diagram of a computer system including EFI ROM.

The present invention provides a method and computer program product allowing a user or software component to prevent any one or more instance of a device driver from loading. This new capability may be used in various ways, such as allowing system boot to continue despite a misbehaving or unresponsive PCI device in the system, or speeding up the system boot by loading only a limited number of device drivers that are commonly utilized.

One embodiment of the present invention provides a method comprising identifying a plurality of PCI devices in a computer system by an associated PCI device handle, wherein each of the PCI devices is also associated with a default EFI device driver. The method further comprises identifying a target PCI device to be disabled from within the plurality of PCI devices, providing a dummy driver that enables fewer functions for the target PCI device than the default EFI device driver, and binding the dummy driver to the target PCI device instead of binding the default EFI device driver associated with the target PCI device.

A "dummy driver", as that term is used herein, means a device driver that enables fewer functions than would be enabled by a default device driver for the same PCI device. In a non-limiting example, a dummy driver provides Supported, Start and Stop EFI functions with no-op code so that these functions are inoperable. Such a dummy driver may be pre-written and available for use to limit the functionality of a PCI device, or the dummy driver may be created in response to identifying a target PCI device to be disabled, whether partially disable or fully disabled.

A target PCI device to be disabled may be identified in several ways. In a first example, a user may provide input, such as a disable request, to a user settings database in EFI ROM to identify a target PCI device to be disabled. During the power on self test (POST), the user settings database in EFI ROM may be searched to identify the target PCI device. Specifically, the device path information embedded in a PCI device handle associated with each of the PCI devices may be compared to the device path information in a UEFI ROM disable request, which may be stored in the user settings database. The foregoing method allows the user to identify any one or more instance of the plurality of PCI devices as a target device to be disabled. In another example, one or more of the PCI devices may be automatically identified as a target PCI device to be disabled in response to the target PCI device having no usage during a predefined time period. Automatically disabling PCI device drivers that are seldomly used provides the advantage of increasing the speed of the boot process.

The dummy driver binds to the target PCI device instead of the default EFI device driver, preferably in accordance with EFI driver binding protocols. For example, the dummy driver may open a PCI IO Protocol exclusively on the PCI device handle of the target PCI device in order to prevent the default EFI device driver from binding to the target PCI device. Alternatively, or in addition, the dummy driver may be provided with a version number that is greater than the version number of the default EFI device driver, so that the dummy driver is preferentially selected for binding instead of the default EFI driver. For example, the range of version numbers available for platform drivers may be from 0x00000000 to 0xFFFFFFFF. Similarly, the dummy driver may be identified as a platform driver which is given priority over other types of EFI device drivers. For example, the range of version numbers reserved for platform drivers may be from 0xFFFFFFF0 to 0xFFFFFFFF. Preferably, the dummy driver binds to the target PCI device during power on self test (POST) or at least prior to booting an operating system. Once the dummy driver binds to the target PCI device, the dummy driver uses the PCI I/O Protocol in the PCI device handle of the target PCI device to access or control memory and I/O on the target PCI device. If, for example, the dummy driver includes no-op code for various EFI functions, then those functions are effectively disabled. If the disabled functions of the PCI device were misbehaving or unresponsive, then the no-op code allows the POST to complete without hanging.

Another embodiment of the invention provides a computer program product including computer usable program code embodied on a computer usable storage medium. The computer program product comprises computer usable program code for identifying a plurality of PCI devices in a computer system by an associated PCI device handle, wherein each of the PCI devices is also associated with a default EFI device driver; computer usable program code for identifying a target PCI device to be disabled from within the plurality of PCI devices; computer usable program code for providing a dummy driver that enables fewer functions for the target PCI device than the default EFI device driver; and computer usable program code for binding the dummy driver to the target PCI device instead of binding the default EFI device driver associated with the target PCI device. It should be recognized that the computer program product may further include computer usable program code for performing any one or more additional steps of the methods described herein.

FIG. 1 is a schematic diagram of an exemplary compute node (or simply "computer") 102 that may be utilized in accordance with one or more embodiments of the present invention. The compute nodes described in the present disclosure may be stand-alone computers, servers, or other integrated or stand-alone computing devices. Thus, the terms "compute node," "blade," "server blade," "computer," and "server" are used interchangeably in the present descriptions.

Computer 102 includes a processor unit 104 that is coupled to a system bus 106. The processor unit 104 may utilize one or more processors, each of which has one or more processor cores. The system bus 106 extends from the processor unit 104 to system memory 136. System memory is the lowest level of volatile memory in computer 102. This volatile memory includes additional higher levels of volatile memory (not shown), including, but not limited to, cache memory, registers and buffers. Data that populates system memory 136 includes an operating system (OS) 138 and application programs 144.

The operating system 138 includes a shell 140, for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 is a text-based, line-oriented user interface, the present invention will equally well support other user interface modes, such as graphical, voice, gestural, etc.

As depicted, the OS 138 also includes a kernel 142, which includes lower levels of functionality for OS 138, including providing essential services required by other parts of OS 138 and application programs 144, including memory management, process and task management, disk management, and mouse and keyboard management. The application programs 144 may include a renderer, shown in exemplary manner as a browser 146. Browser 146 includes program modules and instructions enabling a World Wide Web (WWW) client (i.e., computer 102) to send and receive network messages to the Internet using hypertext transfer protocol (HTTP) messaging.

A PCI Root Bridge 160 is coupled between the system bus 106 and a number "n" of PCIe ports 170 as well as a low pin count (LPC) bridge 180. The PCIe ports 170 are available for connection with various types of components and devices. In the example configuration shown in FIG. 1, port 0 is coupled to a South Bridge 114 that supports a number of universal serial bus (USB) ports 116. For example, a keyboard 118 and a mouse 120 are coupled to two of the USB ports. A network interface controller 130 is coupled to PCIe port 1 and facilitates communication with a network 130. The network 128 may be an external network such as the Internet, or an internal network such as an Ethernet or a virtual private network (VPN). A video adapter 108 is coupled to PCIe port 2 and supports/drives a display 110. PCI3 port 4 is coupled to a hard drive interface 132 that supports a hard drive 134. In one embodiment, the hard drive 134 populates the system memory 136.

The LPC bridge 180 supports a printer 124 and an extensible firmware interface (EFI) read-only memory (ROM) 150. Like BIOS, the EFI provides a software interface between the operating system 138 and platform hardware. However, EFI runs independent of the architecture of the processor 104, includes data tables containing platform information, and provides both boot services and runtime services that are available to the operating system (OS) loader and OS.

In some embodiments, the expanded capabilities of the EFI firmware allow a system to boot from larger disks, boot-up in shorter amounts of time, and utilize CPU-independent drivers. Furthermore, EFI supports a shell environment whereby other EFI applications can gain access to the services in the kernel. EFI also allows for extensions to any nonvolatile storage device coupled to the system, such as an EFI partition of an attached hard disk drive 134.

The EFI ROM 150 will store code for a PCI bus driver, which code is loaded into system memory from and executed from system memory. The PCI bus driver then walks the PCI bus and loads EFI drivers into system memory, where those EFI drivers are typically found in EEPROM installed on individual PCI devices or adapters. However, the present invention provides a method that may selectively load a dummy driver instead of the device-specific UEFI driver. It is even possible that some of onboard PCI devices, such as video and NIC, could have the UEFI driver for their device stored in the EFI ROM.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
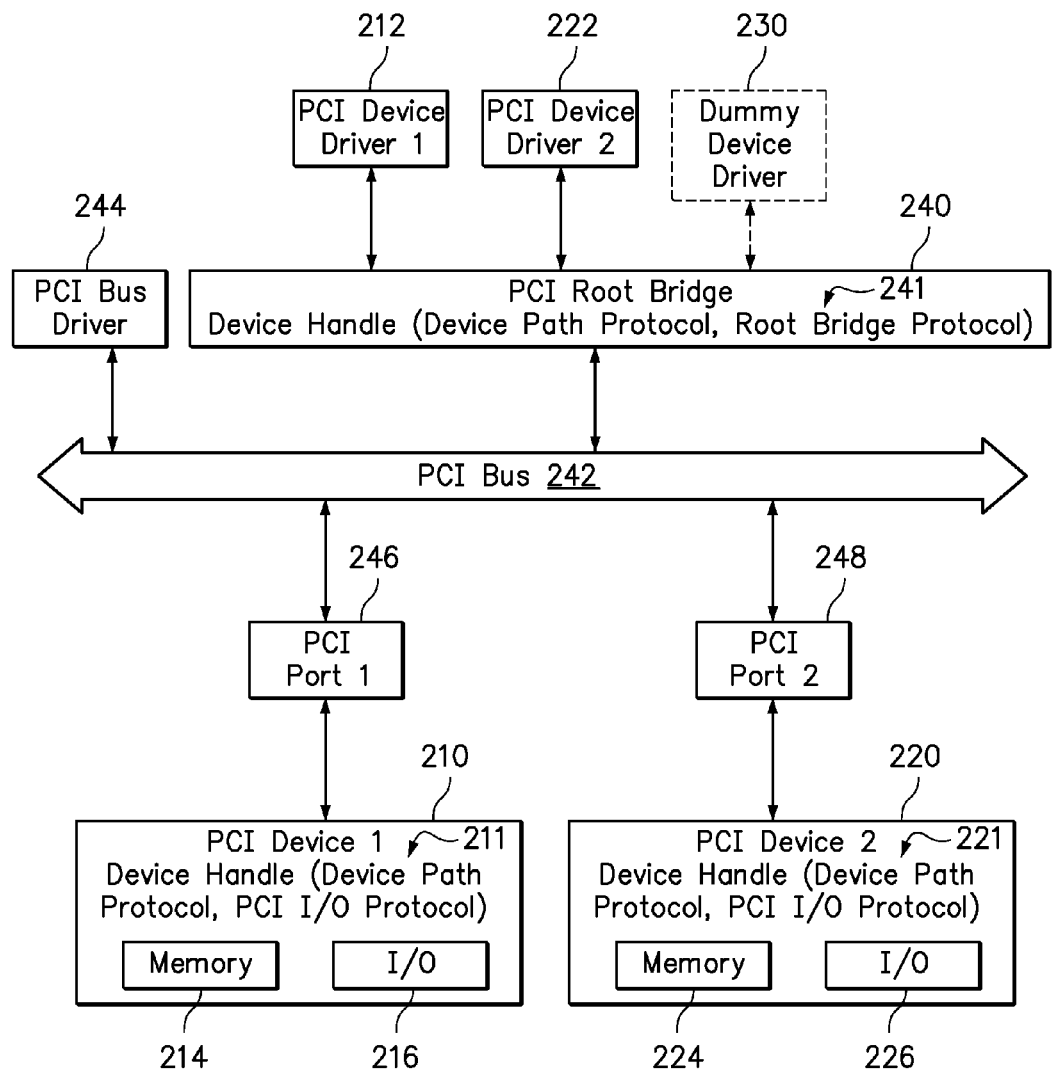
FIG. 2 is a schematic diagram of various PCI device drivers in communication with PCI devices.

FIG. 2 is a schematic diagram of various PCI device drivers in communication with PCI devices. During typical operation of PCI Device 1 (210) and PCI Device 2 (220), the PCI Device Driver 1 (212) and PCI Device Driver 2 (222) control the functionality of the respective PCI devices. For example, PCI Device 1 may include memory 214 and/or an I/O device 216, and PCI Device 2 may include memory 224 and/or an I/O device 226. The device drivers 212, 222, as well as any dummy device drivers 230, may be stored in the EFI ROM 150 (See FIG. 1). Any of the device drivers 212, 222, 230 that bind with a PCI device 210, 220 will communicate through a PCI Root Bridge 240 to a PCI Bus 242, which is controlled by a PCI Bus Driver 244. Communications from the device drivers are routed through PCI Port 1 (246) or PCI Port 2 (248) to the respective PCI device coupled to the port. In order to facilitate these communications, a device driver will discover and utilize the device handle 241 for the PCI Root Bridge 240 and the device handle 211, 221 for the relevant PCI device 210, 220, respectively.

The process of binding a device driver to a PCI device and the process of directing communications using device handles is governed by the details of the EFI specification, which is not repeated here. However, each EFI device driver has to support Supported, Start and Stop functions that a higher level EFI layer can call. A dummy device driver publishes these functions for the DevicePath of the PCI device that the dummy driver targets for disabling or masking and turns one or more of the normal functions of the vendor-supplied device driver into a no-op (no real functionality) so that no work is done in these routines when there is a call for these functions of the PCI device to be used.

It is preferable for the dummy driver to bind as the "exclusive" driver for the target PCI device. "Exclusive binding" is an attribute defined by the EFI specification such that one of the device drivers can become the sole/exclusive owner of the PCI device. Still further, since the EFI specification does not prevent two device drivers from both asserting exclusive ownership of the same PCI device, it is preferable to use the exclusive attribute during the binding process as well as giving the dummy driver a version number which is higher than the default (vendor) driver. According to the EFI specification, the EFI driver with highest version number will be given control of the PCI device. The dummy driver may even be given a version number within the range of values that are reserved for platform use.

One example of a dummy device driver is implemented as follows:

```
#define UEFIROMDISABLE_DRIVER_VERSION 0xFFFFFFF0
EFI_DRIVER_BINDING_PROTOCOL
gUefiRomDisableDriverBinding = {
UefiRomDisableSupported,
UefiRomDisableStart,
UefiRomDisableStop,
UEFIROMDISABLE_DRIVER_VERSION,
NULL,
NULL
};
```

During the POST, EFI Driver dispatcher code will call the Dummy driver which will compare the Device Path of the current PCI device with the Device Path of the PCI device for which the user has selected to disable the UEFI driver. If the Device Paths match, then Open PciIO Protocol exclusively on that PCI Device Handle which will prevent any vendor UEFI driver code to bind later. One example of the EFI driver dispatcher code for this task is implemented as follows:

```
Status = gBS->OpenProtocol (
ControllerHandle,
&gEfiPciIoProtocolGuid,
(VOID **) &PciIo,
This->DriverBindingHandle,
ControllerHandle,
EFI_OPEN_PROTOCOL_BY_DRIVER |
EFI_OPEN_PROTOCOL_EXCLUSIVE
);
```

Figure 3:
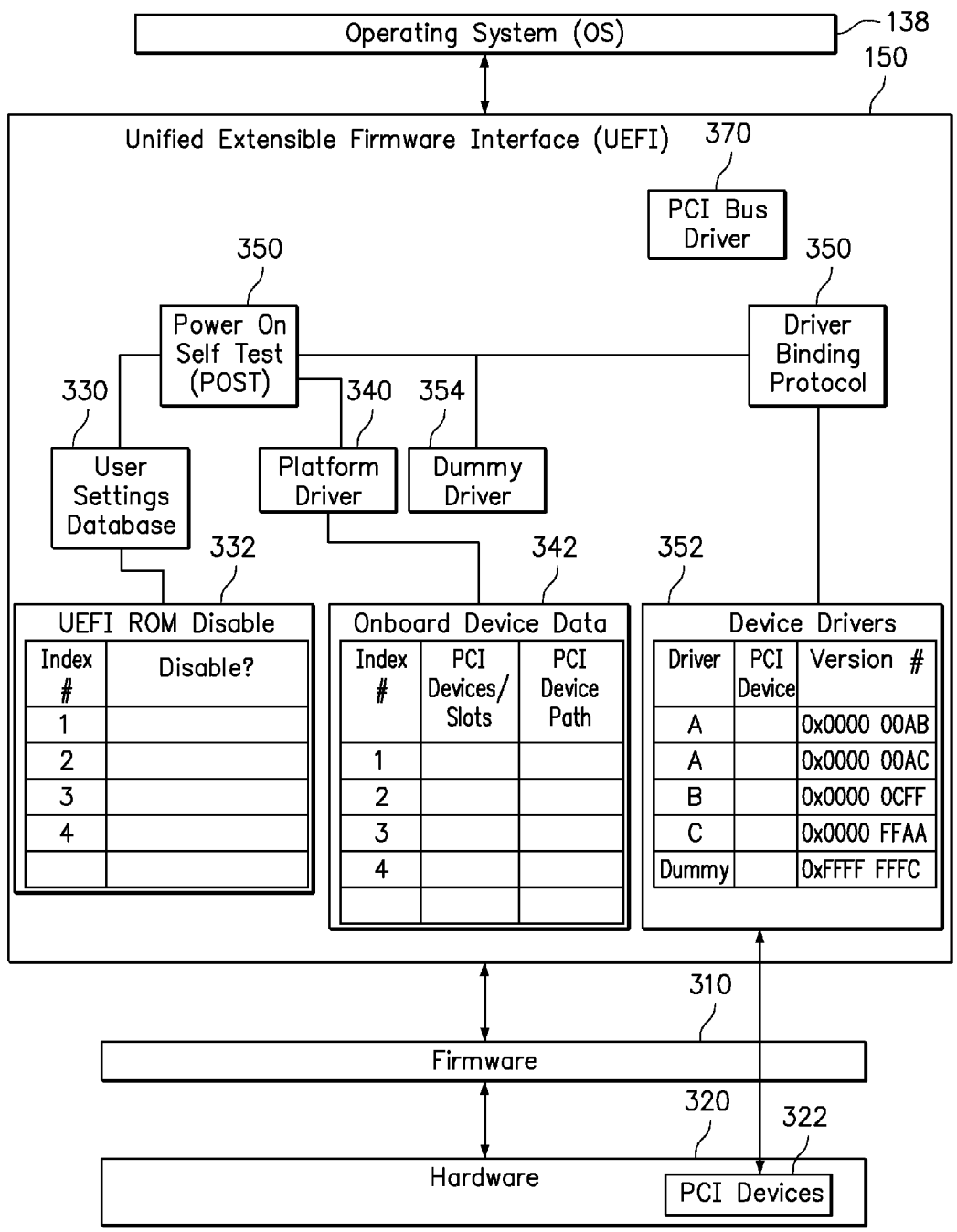
FIG. 3 is a schematic diagram of a UEFI providing an interface between an operating system and the firmware that operates the hardware of the PCI devices.

FIG. 3 is a schematic diagram of a UEFI 150 providing an interface between an operating system 138 and the firmware 310 that operates the hardware 320 of the PCI devices 322. The UEFI 150 includes the code for the PCI bus driver 370, a user settings database 330 that stores UEFI ROM disable requests in a first table 332, a platform driver 340 that collects and stores onboard device data in a second table 342, and a driver binding protocol 350 that maintains a list 352 of device drivers. The code responsible for the power on self-test (POST) 360 communicates with the user settings database 330, platform driver 340 and driver binding protocol 350 to disable one or more of the PCI devices 322.

If a user has provided a PCI device disable request, the disable request is stored in the UEFI ROM Disable table 332. The disable request table 322 is indexed for cross-referencing with the onboard device data table 342. Accordingly, the POST can identify the existence of a disable request in disable request table 322 and, for the targeted PCI Device, lookup the corresponding PCI Device/Slot and PCI DevicePath in the onboard device data table 342. Then, the POST 360 instructs the driver binding protocol 350 (or some other element of the UEFI 150) to create or access a dummy driver 354 that will take exclusive ownership of the targeted PCI device. As previously discussed, the dummy driver may bind in this manner by opening a PCI IO Protocol exclusively on the PCI device handle of the target PCI device in order to prevent the default EFI device driver from binding to the target PCI device. Alternatively, or in addition, the dummy driver may be provided with a version number that is greater than the version number of the default EFI device driver, so that the dummy driver is preferentially selected for binding instead of the default EFI driver.

Figure 4:
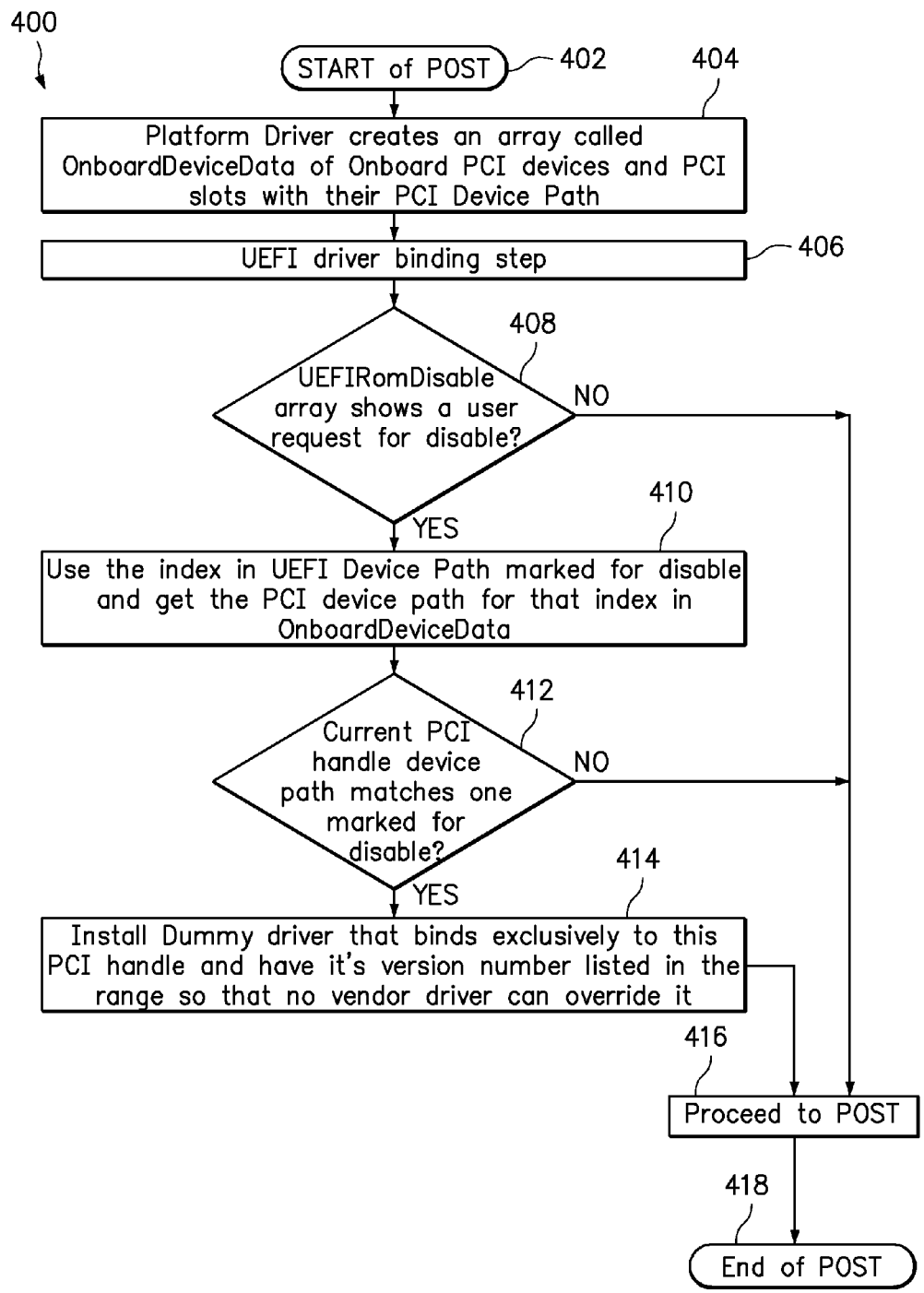
FIG. 4 is a flowchart of a method of managing PCI device drivers during the power on self-test (POST).

FIG. 4 is a flowchart of a method 400 of managing PCI device drivers during the power on self-test (POST). After the POST starts in step 402, then, in step 404, the platform driver (340) creates an array called OnboardDeviceData (342) that identifies onboard PCI devices and PCI slots along with their associated PCI Device Path. The binding of UEFI drivers begins in step 406. In step 408, the UEFI ROM disable array (table 332) is searched to identify whether a user has made a disable request. If not, then the process proceeds to the POST in step 416. However, if the UEFI ROM disable array includes a disable request, then an index from the UEFI ROM disable array is used to obtain the PCI device path for that index in the OnboardDeviceData (table 342), in accordance with step 410.

In step 412, it is determined, for a current PCI device handle undergoing driver binding, whether the PCI handle device path matches a PCI device path that has been marked to be disabled. If not, then the process proceeds to the POST in step 416. However, the there is a match between the current PCI handle device path and the PCI device path that has been marked to be disabled, then step 414 installs a dummy driver that binds exclusively to the PCI handle and has it's version number listed in a range so that no vendor driver can override it. Following step 414, the process proceeds to the POST in step 416, and POST ends in step 418. One or more steps in method 400 may be repeated so that a device driver binds to each PCI Device, whether that device driver is a default (vendor) driver or dummy driver.

In an alternative embodiment, the UEFI ROM Disable table 332 may be automatically populated to disable binding of a default device driver for one or more PCI devices that have not been used over some predefined time period or series of occurrences. Accordingly, if a PCI device is not routinely utilized, then the POST may complete faster without loading the default driver. Still further implementations of the invention may be realized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   identifying a plurality of PCI devices in a computer system by an associated PCI device handle, wherein each of the PCI devices is associated with a default EFI device driver;
   identifying a target PCI device to be disabled from within the plurality of PCI devices;
   providing a dummy driver that enables fewer functions for the target PCI device than the default EFI device driver; and
   binding the dummy driver to the target PCI device, wherein the dummy driver opens a PCI IO Protocol exclusively on the PCI device handle of the target PCI device in order to prevent the default EFI device driver from binding to the target PCI device.

2. The method of claim 1, wherein the dummy driver provides Supported, Start and Stop EFI functions with no-op code.

3. The method of claim 1, further comprising:
   creating the dummy driver for the at least one PCI device in response to identifying the target PCI device.

4. The method of claim 1, wherein identifying a target PCI device to be disabled, includes searching EFI ROM to identify the target PCI device.

5. The method of claim 4, wherein searching UEFI ROM to identify the target PCI device, includes:
   comparing device path information embedded in PCI device handles associated with each of the PCI devices to device path information in a UEFI ROM disable request.

6. The method of claim 1, wherein the dummy driver is bound to the target PCI device during power on self test (POST).

7. The method of claim 1, wherein the dummy driver is bound to the target PCI device prior to booting an operating system.

8. The method of claim 1, further comprising:
   providing the dummy driver with a version number that is greater than the version number of the default EFI device driver.

9. The method of claim 1, wherein the dummy driver is a platform driver.

10. The method of claim 1, wherein binding the dummy driver to the target PCI device instead of the default EFI device driver is performed in accordance with EFI driver binding protocols.

11. The method of claim 1, further comprising:
    storing user input in the EFI ROM, wherein the user input identifies the target PCI device.

12. The method of claim 11, further comprising:
    allowing the user to identify any one or more instance of the plurality of PCI devices as a target device to be disabled.

13. The method of claim 1, further comprising:
    automatically identifying one of the PCI devices as a target PCI device to be disabled in response to the target PCI device having no usage during a predefined time period.

14. The method of claim 1, further comprising:
    identifying a PCI device handle for each of the PCI devices;
    using the device path information embedded in the identified PCI device handle to identify matching device path information in a user EFI ROM disable request.

15. The method of claim 14, wherein the PCI device handle includes a Device Path Protocol instance and a PCI I/O Protocol instance.

16. The method of claim 15, wherein the PCI I/O Protocol is used by the PCI device driver to access memory and I/O on a PCI device.

17. A computer program product including computer usable program code embodied on a non-transitory computer readable storage medium, the computer program product comprising:
    computer usable program code for identifying a plurality of PCI devices in a computer system by an associated PCI device handle, wherein each of the PCI devices is associated with a default EFI device driver;
    computer usable program code for identifying a target PCI device to be disabled from within the plurality of PCI devices;

computer usable program code for providing a dummy driver that enables fewer functions for the target PCI device than the default EFI device driver; and computer usable program code for binding the dummy driver to the target PCI device, wherein the dummy driver opens a PCI IO Protocol exclusively on the PCI device handle of the target PCI device in order to prevent the default EFI device driver from binding to the target PCI device.

18. The computer program product of claim 17, wherein the dummy driver provides Supported, Start and Stop EFI functions with no-op code.

19. The computer program product of claim 17, further comprising:

computer usable program code for creating the dummy driver for the at least one PCI device in response to identifying the target PCI device.

20. The computer program product of claim 17, wherein the dummy driver is bound to the PCI device during power on self test (POST).

21. The computer program product of claim 17, further comprising:

computer usable program code for providing the dummy driver with a version number that is greater than the version number of the default EFI device driver.

22. The computer program product of claim 17, further comprising:

allowing the user to identify any one or more instance of the plurality of PCI devices as a target device to be disabled.

23. The computer program product of claim 17, further comprising:

automatically identifying one of the PCI devices as a target PCI device to be disabled in response to the target PCI device having no usage during a predefined time period.

* * * * *